US008011303B2

(12) United States Patent
Nakayasu et al.

(10) Patent No.: US 8,011,303 B2
(45) Date of Patent: Sep. 6, 2011

(54) GAS GENERATOR

(75) Inventors: Masayuki Nakayasu, Hyogo (JP); Noriaki Noma, Hyogo (JP); Takeo Nikko, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 12/081,311

(22) Filed: Apr. 14, 2008

(65) Prior Publication Data

US 2008/0257195 A1   Oct. 23, 2008

Related U.S. Application Data

(60) Provisional application No. 60/912,877, filed on Apr. 19, 2007.

(30) Foreign Application Priority Data

Apr. 18, 2007 (JP) ................... 2007-108813

(51) Int. Cl.
*C06D 5/00* (2006.01)
(52) U.S. Cl. ........................ 102/530; 280/736
(58) Field of Classification Search ............ 102/530
See application file for complete search history.

(56) References Cited

U.S. PATENT DOCUMENTS

| 5,622,380 | A | | 4/1997 | Khandhadia et al. | |
|---|---|---|---|---|---|
| 6,019,389 | A | * | 2/2000 | Burgi et al. | 280/736 |
| 6,032,979 | A | * | 3/2000 | Mossi et al. | 280/741 |
| 6,149,193 | A | | 11/2000 | Canterberry et al. | |
| 6,168,200 | B1 | | 1/2001 | Greist, III et al. | |
| 6,189,922 | B1 | * | 2/2001 | Parks et al. | 280/735 |
| 6,189,927 | B1 | * | 2/2001 | Mossi et al. | 280/741 |
| 6,198,927 | B1 | | 3/2001 | Wright et al. | |
| 6,648,370 | B2 | | 11/2003 | Koga et al. | |
| 6,659,500 | B2 | | 12/2003 | Whang et al. | |
| 6,860,511 | B2 | | 3/2005 | Patterson | |
| 6,929,284 | B1 | * | 8/2005 | Saso et al. | 280/741 |
| 2003/0146611 | A1 | * | 8/2003 | Kenney et al. | 280/736 |
| 2004/0226472 | A1 | * | 11/2004 | Oda | 102/205 |
| 2007/0001439 | A1 | * | 1/2007 | Matsuda et al. | 280/741 |
| 2007/0257477 | A1 | * | 11/2007 | Ohji et al. | 280/741 |
| 2008/0129027 | A1 | * | 6/2008 | Nakayasu et al. | 280/741 |

FOREIGN PATENT DOCUMENTS

JP   2003-161599 A   6/2003

* cited by examiner

*Primary Examiner* — Michael Carone
*Assistant Examiner* — Samir Abdosh
(74) *Attorney, Agent, or Firm* — Birch, Stewart, Kolasch & Birch, LLP (57) ABSTRACT

A gas generator includes, a housing defining a first combustion chamber and accommodating an enhancer chamber cup member, defining an enhancer chamber, and a combustion chamber cup member provided outside the enhancer chamber cup member and defining a second combustion chamber. The enhancer cup member accommodates a first gas generating agent ignited by a first ignition device, and has an enhancer hole for communicating the enhancer chamber with the first combustion chamber during activation. The combustion chamber cup member accommodates a second gas generating agent ignited by a second ignition device, and has a through-hole for communicating the second combustion chamber with the first combustion chamber during activation. A top plate of the enhancer chamber cup member is positioned higher than a top plate of the combustion chamber cup member, and the enhancer hole is positioned higher than the top plate of the combustion chamber cup member.

11 Claims, 4 Drawing Sheets

GAS GENERATOR

This nonprovisional application claims priority under 35 U.S.C. §119(a) on Patent Application No. 2007-108813 filed in Japan on 18 Apr. 2007 and 35 U.S.C. §119(e) on U.S. Provisional Application No. 60/912,877 filed on 19 Apr. 2007, which are incorporated by reference.

BACKGROUND OF INVENTION

1. Field of Invention

The present invention relates to a gas generator, for example, for a restraining device of a vehicle that is used for an airbag device or the like.

2. Description of Related Art

It is desirable that an output of a gas generator for a restraining device of an automobile could be adjusted to a certain degree according to a collision impact. A dual-type gas generator that is made to meet such a requirement is known. Such a gas generator has a structure in which a plurality of independent combustion chambers are formed inside the gas generator, a gas generating agent is accommodated in each of the combustion chambers, and the ignition and combustion timing of each gas generating agent is adjusted by controlling the timing of activation of igniters provided for each combustion chamber.

FIG. 4 of U.S. Pat. No. 6,189,927 shows an airbag inflator in which a first chamber 234 contains therein a second chamber 282. The ceiling portion of the second chamber 282 is open, a shoulder portion 302 is formed on the peripheral edge thereof, and a lid 285 is attached to the shoulder portion 302. When a gas generating agent located inside the second chamber 282 is combusted, the lid 285 is removed, the combustion gas flows into the first chamber 234, passes through a filter 240, and is discharged to the outside from a gas discharge port 224.

SUMMARY OF INVENTION

The present invention provides a gas generator including:
a housing including a diffuser shell provided with a gas discharge port and a closure shell, a cylindrical filter disposed inside the housing, a first combustion chamber defined inside the cylindrical filter and a second combustion chamber defined inside the first combustion chamber;
the first combustion chamber having an enhancer chamber and a first gas generating agent stored outside the enhancer chamber,
the enhancer chamber, being defined by an enhancer chamber cup member and accommodating therein a first ignition device for igniting and combusting the first gas generating agent,
an enhancer cup member having, in the peripheral surface thereof, an enhancer hole for communicating the enhancer chamber with the first combustion chamber during activation;
the second combustion chamber having a through-hole for communicating the second combustion chamber with the first combustion chamber during activation,
the second combustion chamber being surrounded by a combustion chamber cup member disposed eccentrically to a central axis of the housing,
the second combustion chamber accommodating a second ignition device and a second gas generating agent therein; and
a top plate of the enhancer chamber cup member being positioned higher than a top plate of the combustion chamber cup member, the enhancer hole being positioned higher than the top plate of the combustion chamber cup member.

The present invention provides a gas generator, including:
a housing including a diffuser shell provided with a gas discharge port and a closure shell;
a cylindrical filter disposed within the housing and defining a first combustion chamber including therein a first gas generating agent;
an enhancer cup member provided within the first combustion chamber and defining an enhancer chamber accommodating therein a first ignition device for igniting and combusting the first gas generating agent, the enhancer cup member being provided with an enhancer hole formed in a peripheral surface thereof for communicating the enhancer chamber with the first combustion chamber during activation;
a combustion chamber cup member provided eccentrically to a central axis of the housing within the first combustion chamber, the combustion chamber cup member defining a second combustion chamber including therein a second ignition device and a second gas generating agent, and having a top plate and a through-hole for communicating the second combustion chamber with the first combustion chamber during activation, the combustion chamber cup member being provided such that the enhancer hole is positioned higher than the top plate.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

In the structure described in U.S. Pat. No. 6,189,927, a first igniter assembly 254 (or a cap 270) and the second chamber 282 (or a cup 284) are disposed inside a housing 212 eccentrically with respect to a central axis of the housing, and the height of lid 285 is almost equal (or the lid 285 is slightly lower) to that of the top plate surface of the first igniter 254 (or cap 270).

Therefore, when the gas generating agent is to be loaded into the first chamber 234, the gas generating agent has to be loaded from a gap between the cap 270 and cup 284, and the loading operation itself is difficult. Further, a limitation is placed on the portion for forming an orifice 276 of the cap 270 and also on the ejection direction of the ignition products that are ejected from the orifice 276.

The present invention provides a dual-type gas generator that is easy to assemble and ensures reliable ignition of a gas generating agent.

In the gas generator in accordance with the present invention, the enhancer chamber cup member with the inside thereof serving as an enhancer chamber and a combustion chamber cup member that is less in height than the enhancer chamber cup member are disposed in a space on the inside of the filter within the housing, the space formed thereby serves as a first combustion chamber and the inside of the combustion chamber cup member serves as a second combustion chamber. The first ignition device and second ignition device both include only a well-known electric igniter or a combination of an electric igniter and an enhancer agent. The height of the filter is equal to, or larger than the height of the enhancer chamber cup member, and a space for loading the first gas generating agent is formed inside the filter.

When the gas generator in accordance with the present invention is assembled, first, the combustion chamber cup member having the second gas generating agent accommodated therein, the ignition devices, and the enhancer chamber cup member are mounted inside the closure shell. Then, the cylindrical filter is disposed, and the predetermined amount of the first gas generating agent can be loaded into the space (the first combustion chamber) representing the inside of the housing excluding the second combustion chamber by loading the first gas generating agent toward the top plate of the combustion chamber cup member positioned on the inside of the cylindrical filter.

Further, because at least part of the enhancer holes is positioned higher than the top plate of the combustion chamber cup member, the first gas generating agent is necessarily present in a position directly opposite the enhancer hole. As a result, when the ignition device is actuated and combustion products (ignition energy such as flame and high-temperature gases) is ejected from the enhancer hole, the combustion products and the first gas generating agent easily come into contact with each other. Therefore, such a configuration is effective in terms of reliability of actuation.

As for a plurality of enhancer holes located in positions higher than the top plate of the combustion chamber cup member, the opening direction is preferably provided as if the enhancer holes opposite or directly opposite the circumferential wall portion of the combustion chamber cup member, when viewed from above.

The present invention preferably provides
the gas generator for a restraining device of a vehicle, wherein
the second ignition device includes only an electric igniter, and
the combustion chamber cup member includes a cylindrical member and a cover, an opening portion at one end of the cylindrical member is in contact with a bottom surface of the housing, the cover is placed on an opening portion on the other end side, and a protruding portion is provided in the center of the cover.

The inside of the combustion chamber cup member serves as the second combustion chamber, and the second gas generating agent and an electric igniter having a protruding actuation portion in the central portion thereof are accommodated inside the combustion chamber cup member. Therefore, where a cover is used that has a protruding portion in the center and a small height of a circumference thereof, the actuation portion and the cover do not contact with each other even when the electric igniter is accommodated, the second gas generating agent can be introduced between the actuation portion and the protruding portion of the cover, and therefore the ignition ability of the second gas generating agent is improved. Furthermore, because the surface of the cover, except the protruding portion thereof, can be decreased in height, the capacity of the first combustion chamber can be increased accordingly. The protruding portion may be also provided close to the central portion, rather than in the central portion itself, provided that the protruding portion is directly opposite the actuation portion of the electric igniter.

The present invention preferably provides
the gas generator for a restraining device of a vehicle, wherein
a ratio ($H_2/H_1$) of a height ($H_2$) of the combustion chamber cup member to a height ($H_1$) of the enhancer chamber cup member is within a range of 0.3 to 0.9, and the height of the enhancer chamber cup member is equal to a height from a bottom surface to a ceiling surface of the housing.

As described above, by associating the height of the enhancer chamber cup member with the height of the combustion chamber cup member, the operation of loading the first gas generating agent into the first combustion chamber is facilitated. The top plate of the enhancer chamber cup member may be in contact with the ceiling surface of the housing, or a gap that is sufficiently small to prevent the presence of gas generating agent may be provided between the top plate of the enhancer chamber cup member and the ceiling surface of the housing.

The present invention preferably provides
the gas generator for a restraining device of a vehicle, wherein
the housing has a round planar shape, the filter has a round planar shape, the enhancer chamber cup member has a round planar shape, and the combustion chamber cup member has a circular arc planar shape, and
the combustion chamber cup member is disposed so that a curved portion thereof is positioned on the inner wall surface side of the filter, and a flat portion thereof is positioned on the side of the enhancer chamber cup member.

The circular arc shape is a shape of a segment between optional two points on a circle. When a circumference is divided into two portions by two points located on the circumference, an arc that has a length more than half that of the entire circumference becomes a major arc, and an arc that has a smaller length becomes a minor arc, both arcs having a shape similar to that of letter "D". The "circular arc" as referred to in the description of the present invention also includes a semicircular shape.

Thus, the combustion chamber cup member that has a planar shape (or cross-sectional shape in the width direction) in the form of a circular arc has a curved surface and a flat surface as side surfaces. Therefore, the curved portion can be abutted against, or brought close via a very small gap to the inner wall surface of the filter that has a round planar shape, and the flat portion can be brought close to the enhancer chamber cup member that has a round planar shape (or a round cross-sectional shape in the width direction), thereby making it possible to increase the capacity of the second combustion chamber.

The present invention preferably provides
the gas generator for a restraining device of a vehicle, wherein
the housing has a round planar shape, the filter has a round planar shape, the enhancer chamber cup member has a round planar shape, and the combustion chamber cup member has a planar shape similar to a circular arc including a circumference and a concave curve, and
the combustion chamber cup member is disposed so that a curved portion thereof is positioned on the inner wall surface side of the filter, and a concave curved portion thereof is positioned on the side of the enhancer chamber cup member.

The circular arc shape is defined in the invention set forth in the foregoing The shape similar to a circular arc in the present invention means a shape in which a straight line facing the circumference in a circular arc shape is a concave curve.

Thus, the combustion chamber cup member that has a planar shape (or cross-sectional shape in the width direction) in the form similar to a circular arc has a curved surface and a concave curved surface (that is, a convex curved surface and a concave curved surface) as side surfaces. Therefore, the curved portion can be abutted against, or brought close via a very small gap to the inner wall surface of the filter that has a round planar shape (or a round cross-sectional shape in the width direction), and the concave curved portion can be brought close to the enhancer chamber cup member that has a round planar shape (or a round cross-sectional shape in the width direction), thereby making it possible to increase the capacity of the second combustion chamber.

In the gas generator in accordance with the present invention, the operation of loading the first gas generating agent into the first combustion chamber is facilitated. Further, in the gas generator in accordance with the present invention, the capacity of the second combustion chamber can be increased without changing the size of the entire housing, and the ignition ability of the gas generating agent can be improved.

Figure 1:
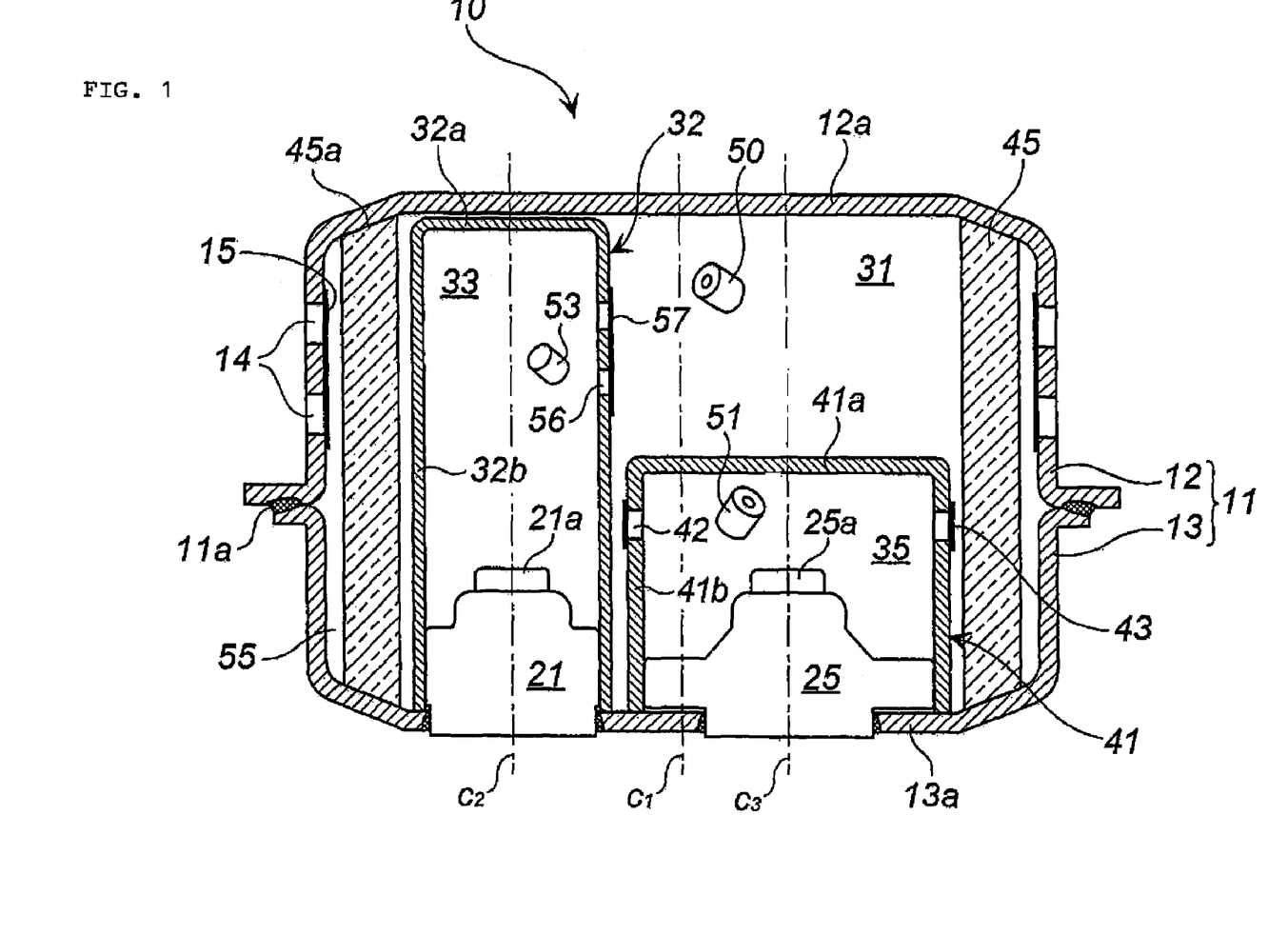
FIG. 1 shows a vertical sectional view of the gas generator in accordance with the present invention.
Figure 2:
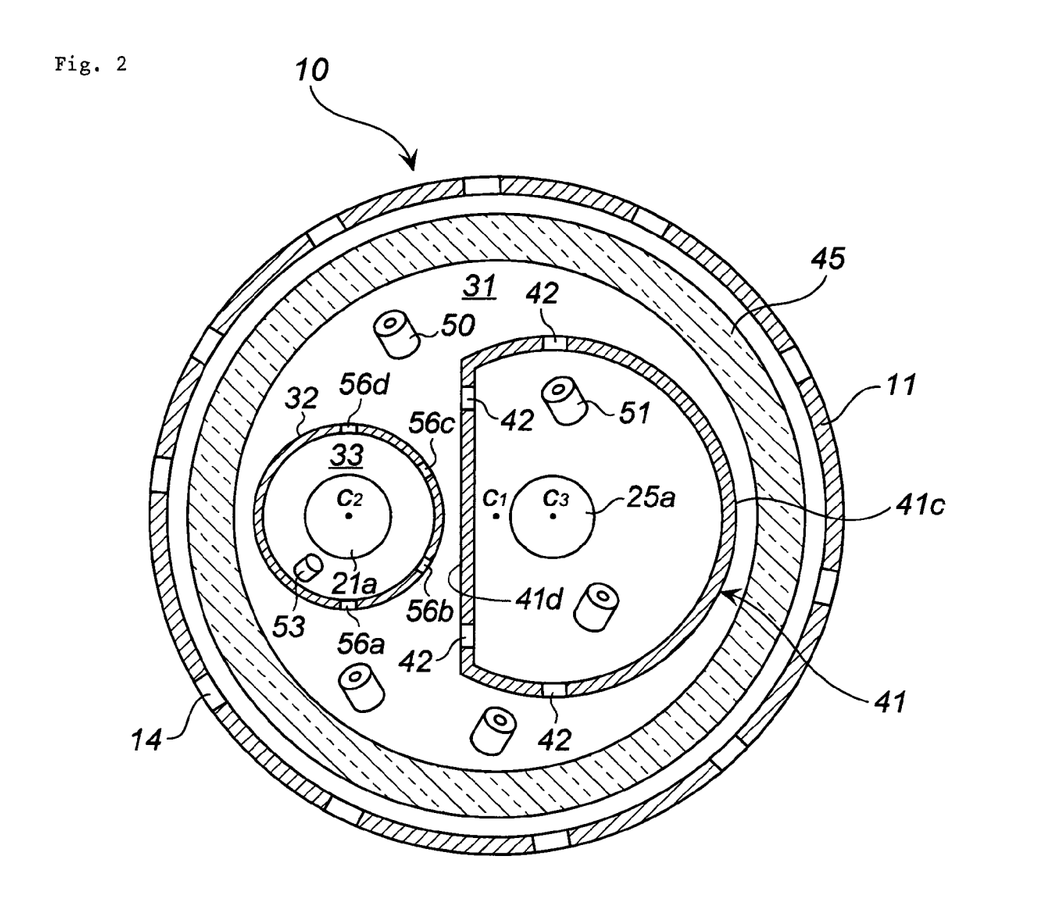
FIG. 2 shows a transverse sectional view of the gas generator shown in FIG. 1.

EMBODIMENT OF THE INVENTION (1) Gas Generator Shown in FIG. 1 and FIG. 2

FIG. 1 is a vertical sectional view of the gas generator in accordance with the present invention. FIG. 2 is a transverse sectional view of the gas generator shown in FIG. 1. In FIG. 2, only the actuation portions of the igniters are shown.

In a gas generator 10, an outer shell is formed by a housing 11 in which a diffuser shell 12 and a closure shell 13 are integrated by welding in a joint portion 11a. The housing 11 has a round planar shape (in the radial cross-section).

A plurality of gas discharge ports 14 are provided in a peripheral surface of the diffuser shell 12 and the ports are closed on the inside with a seal tape 15 made from aluminum or stainless steel to prevent the penetration of moisture from the gas discharge ports 14.

A cylindrical filter 45 having a function of filtering and cooling the combustion gas is disposed inside the housing 11, and a gap 55 is provided between an outer peripheral surface of the filter 45 and the gas discharge ports 14 and the seal tape 15.

A first combustion chamber 31 is formed on the inside of the cylindrical filter 45 within the housing 11. An enhancer chamber cup member 32 and a combustion chamber cup member 41 are disposed on the inside of the cylindrical filter 45, and the first combustion chamber 31 is a space surrounded by an inner wall surface of the housing 11, an inner peripheral surface of the cylindrical filter 45, an outer wall surface of the enhancer chamber cup member 32, and an outer wall surface of the combustion chamber cup member 41. The inside of the first combustion chamber 31 is filled with a first gas generating agent 50.

An opening portion of the enhancer chamber cup member 32 forming an enhancer chamber 33 is press-fitted onto a first igniter 21 (an igniter collar into which the first igniter 21 is fitted) that has been fitted via an orifice formed in a bottom surface 13a of the closure shell 13, and the peripheral edge of the opening portion is abutted against the bottom surface 13a of the closure shell 13. Therefore, the enhancer chamber cup member 32 cannot move in the axial direction or the radial direction.

A top plate 32a and a ceiling surface 12a of the diffuser shell 12 face each other via a very small gap, and the first gas generating agent 50 cannot be present in this gap. The height of the enhancer chamber cup member 32 is almost equal to a height from the bottom surface (bottom surface 13a of the closure shell 13) to the ceiling surface (the ceiling surface 12a of the diffuser shell 12) of the housing 11.

The enhancer chamber cup member 32 has a round planar shape (in the radial cross-section), and a plurality of enhancer holes 56 are provided in the peripheral surface thereof. The plurality of enhancer holes 56 are closed from the outside with a sealing tape 57, but the closing method is not limited to the sealing tape. The enhancer holes 56 are formed in a position (in the diffuser ceiling surface 12a side) higher that a top plate 41a of the combustion chamber cup member 41. Part of the enhancer holes 56 may be formed in a portion that faces a peripheral surface 41b of the combustion chamber cup member 41. Further, the enhancer holes may be also formed in a portion that does not face the peripheral surface 41b in a position lower than the diffuser ceiling surface 12a.

An enhancer agent 53 is accommodated inside the enhancer chamber 33, and the enhancer agent 53 and the first igniter 21 form a first ignition device. As to the first igniter 21, an electric igniter that is actuated by an ignition current is retained by and fixed to a metal igniter collar. For example, an igniter obtained by appropriately deforming the shape of the igniter collar shown in FIG. 1 of JP-A No. 2003-161599 can be used. In the first igniter 21, an actuation portion 21a including an ignition agent for actuation is provided in a protruding condition. The igniter collar of the first igniter 21 is fixed by welding to the bottom surface 13a, and there is no gap in the boundary portion (welded portion) of the igniter collar and the bottom surface 13a. Therefore, the penetration of moisture is prevented.

A second combustion chamber 35 is formed by the combustion chamber cup member 41 disposed within the first combustion chamber 31 and the bottom surface 13a of the closure shell, and the second combustion chamber 35 is completely enclosed in the first combustion chamber 31.

An opening portion of the combustion chamber cup member 41 is press-fitted onto, or welded to a second igniter 25 (an igniter collar into which the second igniter 25 is fitted) that has been fitted via an orifice formed in the bottom surface 13a of the closure shell 13, and the peripheral edge of the opening portion is abutted against the bottom surface 13a of the closure shell 13. Therefore, the combustion chamber cup member 41 cannot move in the axial direction or the radial direction. An igniter similar to the first igniter 21 can be used as the second igniter 25. In the second igniter 25, an actuation portion 25a including an ignition agent for actuation is provided in a protruding condition. The igniter collar of the second igniter 25 is fixed by welding to the bottom surface 13a, and there is no gap in the boundary portion (welded portion) of the igniter collar and the bottom surface 13a. Therefore, the penetration of moisture is prevented.

The top plate 41a of the combustion chamber cup member 41 is positioned lower than the top plate 32a of the enhancer chamber cup member 32. The ratio $H_2/H_1$ of the height ($H_2$) of the top plate 41a to the height ($H_1$) of the top plate 32a is preferably within a range of 0.3 to 0.9, more preferably within a range of 0.5 to 0.8.

A plurality of gas communication holes 42 are provided in the peripheral surface 41b of the combustion chamber cup member 41. Prior to actuation, the gas communication holes are closed from the outside with a stainless steel tape 43. The stainless steel tape 43 has a thickness of 100 μm, and when the tape is fractured and ruptured by the pressure applied by the combustion of a second gas generating agent 51, the first combustion chamber 31 communicates with the second combustion chamber 35. The stainless steel tape is not affected in any way by the combustion of the first gas generating agent 50. A method other than that using the stainless steel tape may be used for closing the gas communication holes 42.

As shown in FIG. 2, the combustion chamber cup member 41 has a planar shape (a cross-sectional shape in the width direction) in the form of circular arc (shape similar to that of letter "D") and has a curved portion 41c and a flat portion 41d as the side surfaces. The combustion chamber cup member 41 is disposed so that the curved portion 41c thereof is close to the inner peripheral surface of the cylindrical filter 45, and the flat portion 41d is close to a peripheral wall 32b of the enhancer chamber cup member 32. The gap between the curved portion 41c and the inner peripheral surface of the cylindrical filter 45 and the gap between the flat portion 41d and the peripheral wall 32b of the enhancer chamber cup member 32 are made small at least to a degree sufficient to prevent the presence of the first gas generating agent 50. The curved portion 41c may abut against the inner peripheral surface of the cylindrical filter 45.

Because the combustion chamber cup member 41 has the above-described shape, as shown in FIG. 1 and FIG. 2, the distance between the central axis C1 of the housing 11 and the central axis C2 of the first igniter 21 is longer than the distance between C1 and the central axis C3 of the second igniter 25. As a result, the capacity of the second combustion chamber 35 can be further increased.

The gas communication holes 42 can be formed in the desired position of the curved portion 41c and flat portion 41d of the combustion chamber cup member 41. The number and location sites of enhancer holes 56 are not particularly limited, but it is preferred that the opening directions of the plurality of enhancer holes 56 located in positions higher than the top plate 41a of the combustion chamber cup member 41 face a side of the flat portion 41d of the combustion chamber cup member 41.

The enhancer holes 56 (56a to 56d) formed in the peripheral wall 32b of the enhancer chamber cup member 32 are formed in the right half (region of 180° on the side of the combustion chamber cup member 41) of the enhancer chamber cup member 32. The enhancer holes 56a, 56d do not face the combustion chamber cup member 41, and are formed by four (a total of eight) holes in the axial direction. The enhancer holes 56b, 56c face the side of the combustion chamber cup member 41 and are formed, by two (a total of four) holes in positions higher than the top plate 41a of the combustion chamber cup member 41, as shown in FIG. 1.

Further, the operation in the case where the gas generator shown in FIG. 1 and FIG. 2 is applied to an airbag system of an automobile will be explained below. When an automobile receives a small impact during a collision, only the first igniter 21 is actuated, and when the impact is large, the first igniter 21 and the second igniter 25 are actuated at the same time. When the impact is of medium strength, initially the first igniter 21 is actuated and then the second igniter 25 is actuated with a delay. This case will be explained below.

The first igniter 21 and the second igniter 25 are connected to a control unit (not shown in the drawings) installed on a vehicle. When the automobile collides and receives the impact, an actuation signal is received from the control unit, the first igniter 21 is actuated and ignited, and the enhancer agent 53 is ignited and combusted. Then, because the pressure inside the enhancer chamber 33 rises, the sealing tape 57, which closes the enhancer holes 56, is ruptured and combustion products (ignition energy) are ejected from the enhancer chamber into the first combustion chamber 31.

Due to the ejection of the combustion products, the first gas generating agent 50 is ignited and combusted and a high-temperature combustion gas is generated. In particular, because a comparatively large amount of the first gas generating agent 50 is present on the extension lines of the enhancer holes 56b, 56c, the ignition ability is improved. The combustion gas is filtered and cooled, while passing through the filter 45, and then ruptures the sealing tape 15. As a result, the combustion gas is discharged form the gas discharge ports 14 and inflates the airbag. At this time, the second combustion chamber 35 is defined by the cup member 41, and the gas communication hole 42 is closed by the stainless steel tape 43 and, therefore, the stainless steel tape is not ruptured by the external pressure. Accordingly, the combustion products generated in the first combustion chamber 31 do not flow into the second combustion chamber 35.

The second igniter 25 is actuated and ignited with a slight delay, the second gas generating agent 51 is ignited and combusted, and a combustion gas is generated. The combustion gas ruptures the stainless steel tape 43, which closes the gas communication holes 42, and creates communication between the first combustion chamber 31 and the second combustion chamber 35. Then, the combustion gas flows out into the first combustion chamber 31 via the gas communication holes 42 and is filtered and cooled when passes through the filter 45. Then, the combustion gas is discharged from the gas discharge ports 14 and further inflates the airbag.

A method of assembling the gas generator shown in FIG. 1 and FIG. 2 will be explained below. The enhancer chamber cup member 32 (the enhancer holes 56 are closed with the tape 57) filled with the enhancer agent 53 and the combustion chamber cup member 41 (the communication holes 42 are closed with the tape 43) filled with the second gas generating agent 51 are attached to the closure shell 13 having the first igniter 21 and the second igniter 25 attached thereto. The filter 45 is then disposed in the closure shell 13.

Then, the first gas generating agent 50 is loaded into a space (first combustion chamber 31) formed by the filter 45. At this time, where the first gas generating agent 50 is loaded toward the top plate 41a of the combustion chamber cup member 41, the gas generating agent spreads naturally in the space of the first combustion chamber 31. Therefore, the loading operation is facilitated. If necessary, vibrations can be applied to enhance the loading of the first gas generating agent 50. The first gas generating agent 50 does not enter the gaps between the curved portion 41c of the combustion chamber cup member 41 and the inner peripheral surface of the cylindrical filter 45 and between the flat portion 41d of the combustion chamber cup member 41 and the peripheral wall 32b of the enhancer chamber cup member 32.

Finally, a diffuser shell (the gas discharge ports are closed with the seal tape 15) is attached and the flange portion is welded to obtain a weld 11a.

Figure 3:
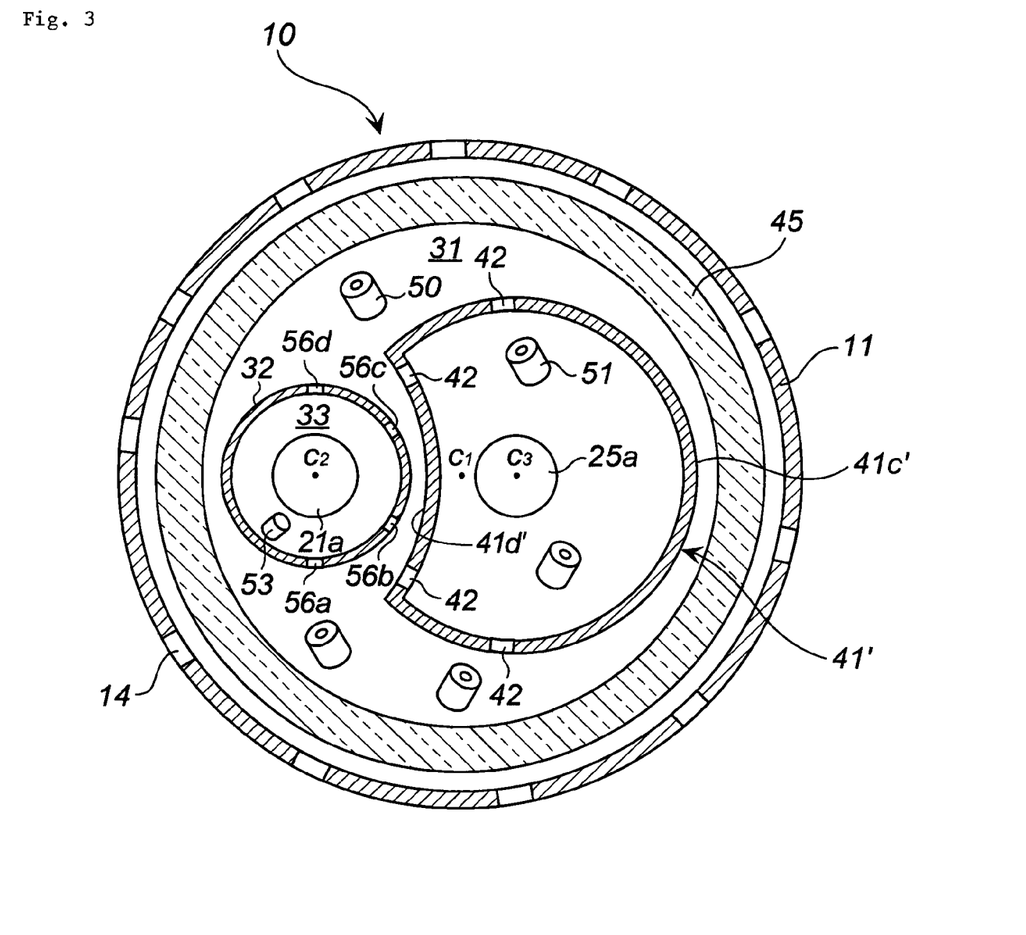
FIG. 3 shows a transverse sectional view of the gas generator of another embodiment.

(2) Gas Generator Shown in FIG. 3

FIG. 3 is a transverse sectional view of the gas generator 10 that is another embodiment of the present invention. The difference between the gas generator shown in FIG. 3 and the gas generator 10 shown in FIG. 1 and FIG. 2 is only in the partial shape of the combustion chamber cup member 41. FIG. 3 shows only the actuation portions of the igniters.

As shown in FIG. 3, the combustion chamber cup member 41' has a planar shape (cross-sectional shape in the width direction) similar to a circular arc and has a curved portion 41c' and a concave curved portion 41d' as side surfaces. The combustion chamber cup member 41' is disposed so that the curved portion 41c' thereof is close to the inner peripheral surface of the cylindrical filter 45, and the concave curve portion 41d' is close to the peripheral wall 32b of the enhancer chamber cup member 32. The gap between the curved portion 41c' and the inner peripheral surface of the cylindrical filter 45 and the gap between the concave curved portion 41d' and the peripheral wall 32b of the enhancer chamber cup member 32 are made small at least to a degree sufficient to prevent the presence of the first gas generating agent 50. The curved portion 41c' may be brought into contact with the inner peripheral surface of the cylindrical filter 45.

Figure 4:
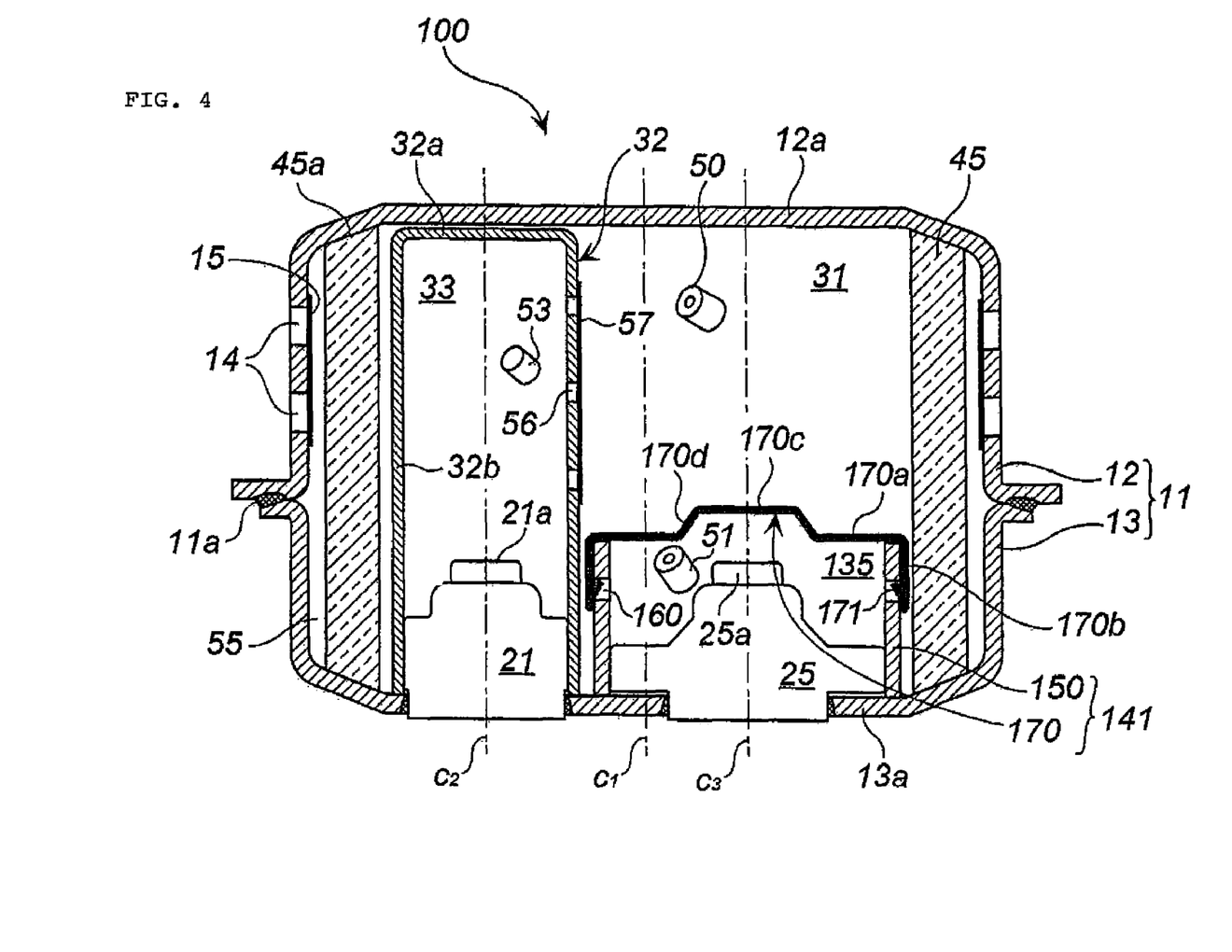
FIG. 4 shows a vertical sectional view of the gas generator of another embodiment.

(3) Gas Generator Shown in FIG. 4

FIG. 4 is a vertical sectional view of a gas generator 100 that is another embodiment of the present invention. The components identical to those of the gas generator 10 shown in FIG. 1 are denoted by identical reference numerals.

A combustion chamber cup member 141 has a tubular member 150 and a cover 170. The planar shape of the tubular member 150 and the cover 170 is similar to that of the combustion chamber cup member 41 shown in FIG. 2 or FIG. 3. A plurality of holes (or concave portions) 160 are formed in the peripheral surface of the tubular member 150. An opening at one end side of the tubular member 150 is in contact with a closure shell bottom surface 13a, and an opening at the other end side is covered with the cover 170.

The cover 170 has a shallow cup shape with a bottom having a flat portion 170a and a peripheral surface portion 170b. A protruding portion 170c is provided in the center of the flat portion 170a, and an annular inclined portion 170d is provided between the flat portion 170a and the protruding portion 170c. A plurality of hooks 171 that are bent inward in the direction of the flat portion 170a are provided at the peripheral edge of the opening of the peripheral surface portion 170b. The cover 170 has a thickness less than that of the tubular portion 150 and is formed from an elastic material.

The cover 170 is fixed to the tubular member 150 by securing the plurality of hooks 171 in the plurality of holes (or concave portions) 160 of the tubular member 150.

The cover 170 can be fixed in the following manner. The hooks 171 are brought close to the holes 160, while applying a force so as to expand outwardly the peripheral edge of the opening of the peripheral surface portion 170b of the cover 170. Where the force is then released in this state, the peripheral edge of the opening of the peripheral surface portion 170b will close inwardly (that is, will restore the shape before the expansion), and the hooks 171 will be pressed against the peripheral surface portion 170b and inserted into the holes 160.

A second igniter 25 is accommodated inside the combustion chamber cup member 141 (an assembly of the tubular member 150 and cover 170). Because the actuation portion 25a of the second igniter 25 is positioned directly below the protruding portion 170c of the cover 170, although the flat portion 170a is lower than the protruding portion 170c, it produces no adverse effect on the accommodation of the second igniter 25. Further, because the flat portion 170a can be positioned lower than the protruding portion 170c, the capacity of the first combustion chamber 31 can be enlarged accordingly.

The protruding portion 170c of the combustion chamber cup member 141 is positioned lower than a top plate 32a of an enhancer chamber cup member 32. The ratio $H_2/H_1$ of the height ($H_2$) of the protruding portion 170c to the height ($H_1$) of the top plate 32a is preferably within a range of 0.3 to 0.9, more preferably within a range of 0.5 to 0.8.

In the gas generator 100 shown in FIG. 4, when the second igniter 25 is actuated and the second gas generating agent 51 is combusted, the entire cover 170 or part thereof is fractured and the combustion gas flows into the first combustion chamber 31.

A method for assembling the gas generator 100 shown in FIG. 4 will be explained below. The enhancer chamber cup member 32 (enhancer holes 56 are closed with a tape 57) filled with an enhancer agent 53 is attached to a closure shell 13 having the first igniter 21 and the second igniter 25 attached thereto. The tubular member 150 is then attached around the second igniter 25, and the accommodation space of the second gas generating agent 51 is formed. Then, the second gas generating agent 51 is loaded from an opening in the upper end of the tubular member 150, and because the loading can thus be performed from the opening at the upper end, the operation is facilitated. The cover 170 is then attached to the opening after the second gas generating agent 51 has been loaded.

Then a filter 45 is disposed in a closure shell 13, and a first gas generating agent 50 is loaded toward the top of the cover 170 located within the space surrounded by the filter 45 in the same manner as in the gas generator 10 shown in FIG. 1.

The invention thus described, it will be obvious that the same may be varied in many ways. Such Variations are not to be regarded as a departure from the spirit and scope of the invention, and all such modifications as would be obvious to one skilled in the art are intended to be included within the scope of the following claims.

The invention claimed is:

1. A gas generator, comprising:
a housing including a diffuser shell provided with a gas discharge port and a closure shell, a cylindrical filter disposed inside the housing, a first combustion chamber defined inside the cylindrical filter, and a second combustion chamber defined inside the first combustion chamber,
the first combustion chamber having an enhancer chamber and a first gas generating agent stored outside the enhancer chamber,
the enhancer chamber, being defined by an enhancer chamber cup member and accommodating therein a first ignition device for igniting and combusting the first gas generating agent,
the enhancer chamber cup member including a first end, a second end opposite to the first end, and a circumferential surface extending from the first end to the second end, the first end being provided with a first top plate, and the circumferential surface including an enhancer hole communicating the enhancer chamber with the first combustion chamber during activation,
the second combustion chamber being surrounded by a combustion chamber cup member disposed eccentrically to a central axis of the housing, the combustion chamber cup member including a second top plate and a through-hole for communicating the second combustion chamber with the first combustion chamber during activation,
the second combustion chamber accommodating a second ignition device and a second gas generating agent therein, and
the first top plate being positioned higher than the second top plate so that a space accommodating the first gas generating agent is provided above the second top plate, and the enhancer hole being provided such that the enhance hole opposes the space where the first gas generating agent is provided.

2. The gas generator according to claim 1, wherein
the second ignition device comprises an electric igniter, and
the combustion chamber cup member includes a cylindrical member having a first opening portion and a second opening portion opposite to the first opening portion, and provided such that the first opening portion is in contact with a bottom surface of the housing, and the second top plate, provided separately from the cylindrical member, is placed on the second opening portion to cover the second opening portion, and wherein the second top plate is provided with a protruding portion at the center thereof.

3. The gas generator according to claim 1, wherein a ratio H2/H1 of a height (H2) of the combustion chamber cup member to a height (H1) of the enhancer chamber cup member is within a range of 0.3 to 0.9, and the height of the enhancer chamber cup member is equal to a height from a bottom surface to a ceiling surface of the housing.

4. The gas generator according to claim 1, wherein the housing has a round planar shape, the filter has a round planar shape, the enhancer chamber cup member has a round planar shape, and the combustion chamber cup member has a circular arc planar shape, and the combustion chamber cup member is disposed so that a curved portion thereof is positioned on the inner wall surface side of the filter, and a flat portion thereof is positioned on the side of the enhancer chamber cup member.

5. The gas generator according to claim 1, wherein the housing has a round planar shape, the filter has a round planar shape, the enhancer chamber cup member has a round planar shape, and the combustion chamber cup member has a planar shape similar to a circular arc comprising a circumference and a concave curve, and the combustion chamber cup member is disposed so that a curved portion thereof is positioned on the inner wall surface side of the filter, and a concave curved portion thereof is positioned on the side of the enhancer chamber cup member.

6. A gas generator, comprising:

a housing including a diffuser shell provided with a gas discharge port and a closure shell, the housing defining therein a first combustion chamber accommodating a first gas generating agent therein;

an enhancer chamber cup member provided within the first combustion chamber and defining an enhancer chamber accommodating therein a first ignition device for igniting and combusting the first gas generating agent, the enhancer chamber cup member including a first end, a second end opposite to the first end, and a circumferential surface extending from the first end to the second end, the first end being provided with a first top plate, and the circumferential surface being provided with an enhancer hole communicating the enhancer chamber with the first combustion chamber during activation; and a combustion chamber cup member provided eccentrically to a central axis of the housing within the first combustion chamber, the combustion chamber cup member defining a second combustion chamber including therein a second ignition device and a second gas generating agent, and having a second top plate and a through-hole for communicating the second combustion chamber with the first combustion chamber during activation, the combustion chamber cup member being provided such that the enhancer hole is provided in the circumferential surface of the enhancer cup member at a height between the first top plate and the second top plate, the first top plate being positioned higher than the second top plate so that a space accommodating the first gas generating agent is provided above the second top plate, and the enhancer hole being provided such that the enhancer hole opposes the space where the first gas generating agent is provided.

7. The gas generator according to claim 2, wherein a ratio H2/H1 of a height (H2) of the combustion chamber cup member to a height (H1) of the enhancer chamber cup member is within a range of 0.3 to 0.9, and the height of the enhancer chamber cup member is equal to a height from a bottom surface to a ceiling surface of the housing.

8. The gas generator according to claim 2, wherein the housing has a round planar shape, the filter has a round planar shape, the enhancer chamber cup member has a round planar shape, and the combustion chamber cup member has a circular arc planar shape, and the combustion chamber cup member is disposed so that a curved portion thereof is positioned on the inner wall surface side of the filter, and a flat portion thereof is positioned on the side of the enhancer chamber cup member.

9. The gas generator according to claim 2, wherein the housing has a round planar shape, the filter has a round planar shape, the enhancer chamber cup member has a round planar shape, and the combustion chamber cup member has a planar shape similar to a circular arc comprising a circumference and a concave curve, and the combustion chamber cup member is disposed so that a curved portion thereof is positioned on the inner wall surface side of the filter, and a concave curved portion thereof is positioned on the side of the enhancer chamber cup member.

10. A gas generator, comprising:

a housing;

a first combustion chamber defined inside the housing;

an enhancer chamber cup member accommodated inside the first combustion chamber and defining, therein, an enhancer chamber, the enhancer chamber cup member having a first end, a second end opposite to the first end, a circumferential surface extending from the first end to the second end, a first top plate provided at the first end, and an enhancer hole provided in the circumferential surface for communicating the enhancer chamber with the first combustion chamber during activation; and a combustion chamber cup member accommodated inside the first combustion chamber and outside the enhancer chamber cup member and defining therein a second combustion chamber, the combustion chamber cup member having a second top plate at an upper end thereof and a through-hole for communicating the second combustion chamber with the first combustion chamber during activation, wherein the enhancer chamber cup member accommodates a first ignition device and a first gas generating agent ignited by the first ignition device, the combustion chamber cup member accommodates a second ignition device and a second gas generating agent ignited by the second ignition device, the enhancer hole is provided in the circumferential surface of the enhancer chamber cup member at a height between the first top plate and the second top plate, and the first top plate is positioned higher than the second top plate so that a space accommodating the first gas generating agent is provided above the second top plate, and the enhancer hole is provided such that the enhancer hole opposes the space where the first gas generating agent is provided.

11. The gas generator according to claim 10, wherein the first top plate is positioned higher than the second top plate.

* * * * *